Dec. 21, 1926.
C. CARTER
1,611,511
CULTIVATOR
Original Filed Sept. 12, 1925    2 Sheets-Sheet 1
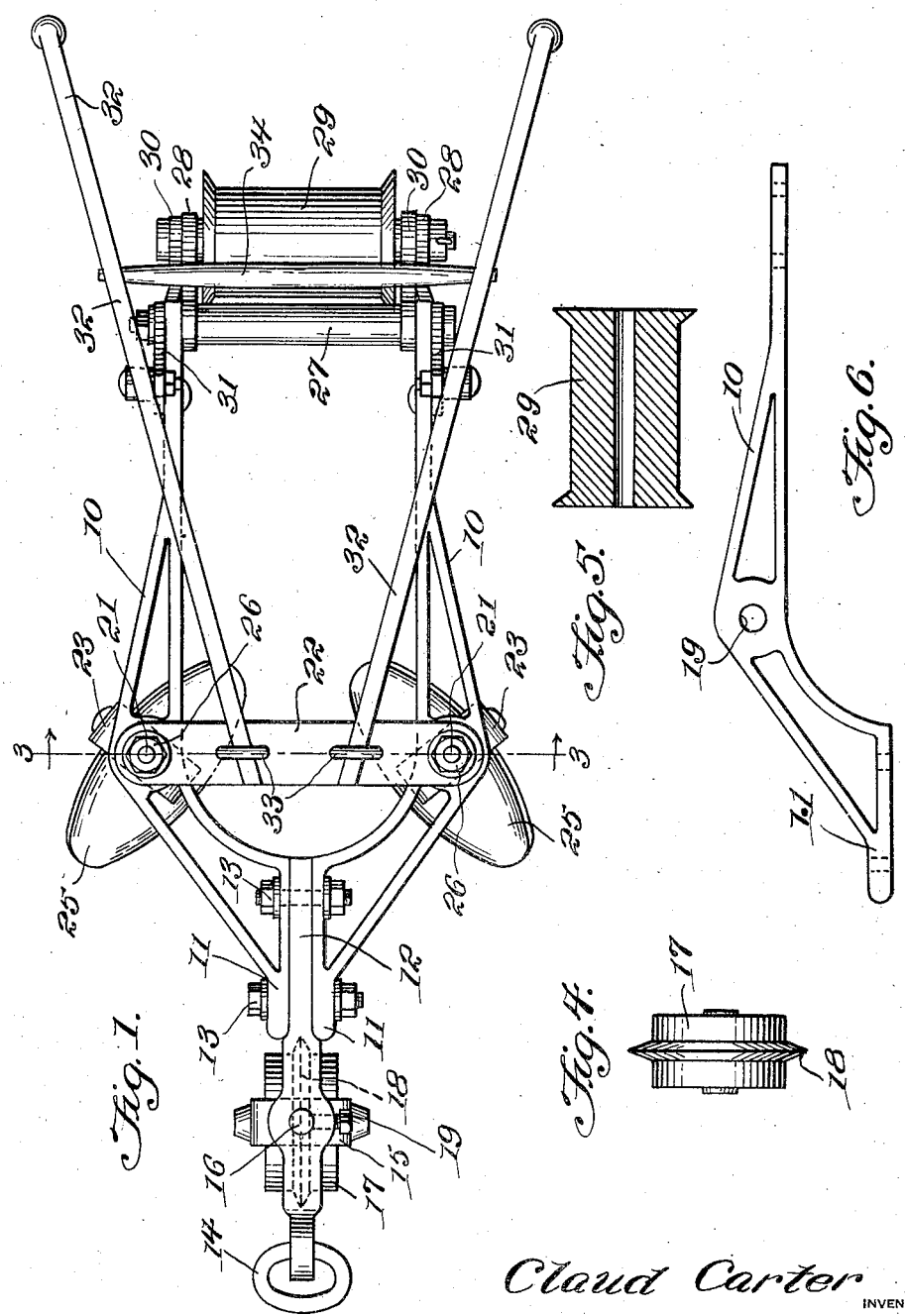
Claud Carter
INVENTOR
BY Victor J. Evans
ATTORNEY
WITNESS: J.T.L. Wright

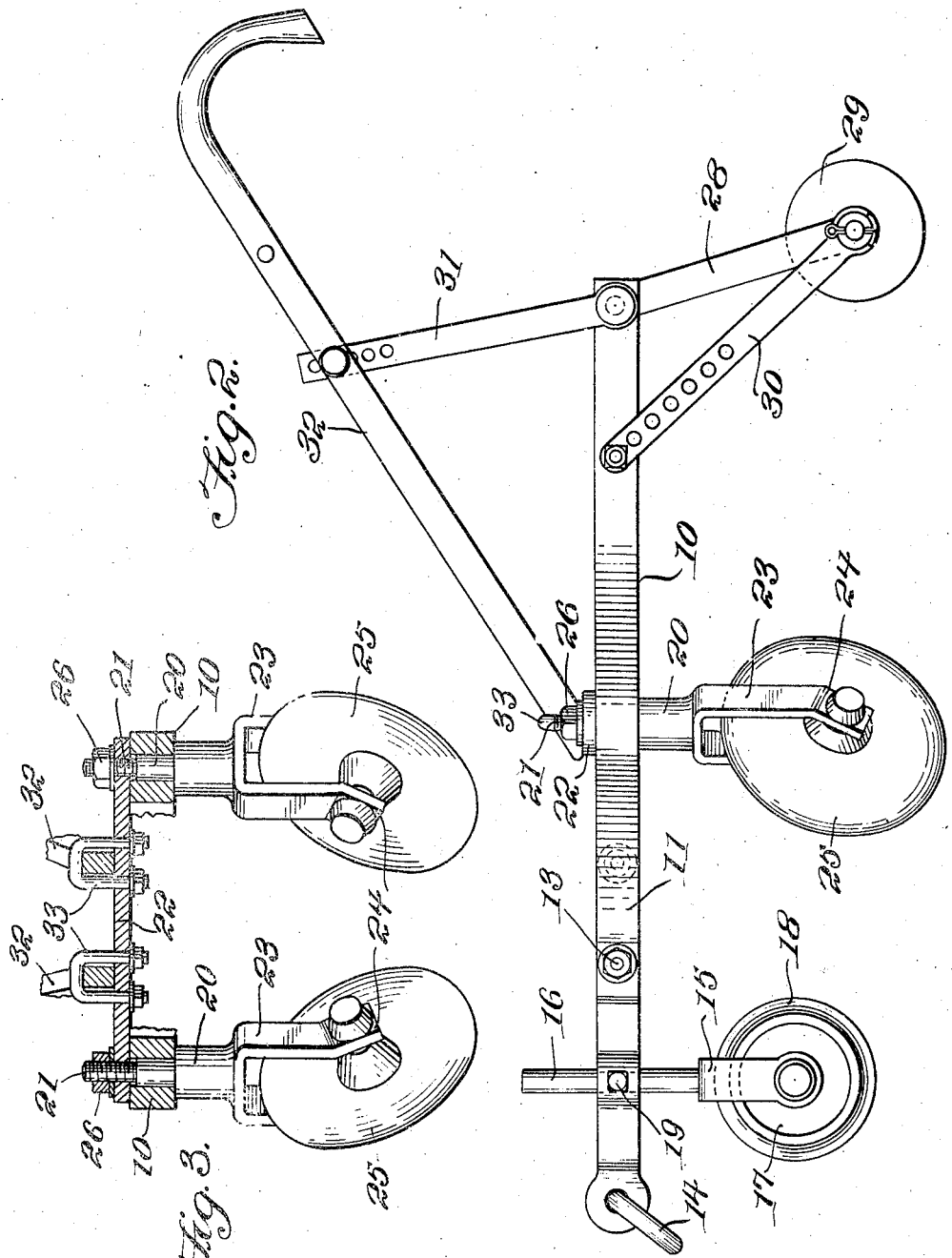

Patented Dec. 21, 1926.

1,611,511

UNITED STATES PATENT OFFICE.

CLAUD CARTER, OF ADAIRVILLE, KENTUCKY, ASSIGNOR OF ONE-HALF TO FRED JONAS, OF ADAIRVILLE, KENTUCKY.

CULTIVATOR.

Application filed September 12, 1925, Serial No. 56,021. Renewed November 5, 1926.

This invention relates to improvements in cultivators, the general object being the provision of means upon the cultivator for setting harrow disks at an inclination thereon for hilling, and which owing to the construction and mounting thereof will not choke nor drag the fertilizer nor cling to roots or the like, but may be equally and effectually used in hilling tobacco, cotton, corn, potatoes, beans, etc.

Another object of my invention is the provision of a vertically adjustable guide disk carried upon the forward end of the cultivator in regulating the depth to which the disk will cut.

A further object of my invention is the provision of an adjustable roller carried upon the rear portion and between the handles of the cultivator which will roll off the tops of the hills thus formed by the disks and it being so adjustably mounted upon the handles as to also afford a corresponding adjustment to the latter.

With the above and other objects in view, the invention includes novel features and details of construction, to be hereinafter more fully described, illustrated in the accompanying drawings, and pointed out in the appended claim.

In the drawings—

Figure 1 is a top plan view of my invention.

Figure 2 is a side elevation thereof.

Figure 3 is a transverse section taken on line 3—3 of Figure 1.

Figure 4 is a front elevation of the vertically adjustable guide disk.

Figure 5 is a longitudinal section taken through the roller.

Figure 6 is a side elevation of one of the frame members comprising the cultivator.

Referring to the drawings in detail, wherein like characters of reference denote corresponding parts, the reference characters 10 indicate corresponding or combined frame members, each of which having their forward ends extending inwardly one toward the other and terminating thereon in spaced parallel apertured plates 11 for the reception of the inner free end of a tongue 12 to be rigidly secured therein through the instrumentality of fastening elements in the form of bolts 13 while arranged within the forward end of the tongue 12 is a coupling link 14 which may be either attached to single and double trees or the conventional form of towing apparatus upon tractors.

Rotatably mounted within the lower bifurcated end portion 15 of a vertically disposed shaft 16 is a drum 17 having a circumferential cutting edge 18 arranged centrally of the width thereof while the vertically disposed shaft 16 is vertically adjustable within the tongue 12 and held rigidly in a desired adjusted position through the instrumentality of a set screw 19. Extending through openings provided in the apertured side of the frame members 12 are shafts 20 having their upper reduced shank portions 21 extending through registering openings provided in the opposite end of a transverse plate 22 while the lower portions of the shafts 20 are provided with bifurcated portions 23 terminating in substantially offset end portions 24. Within the portions 24 the disks 25 are rotatably mounted, and owing to the relative arrangement and mounting of the disks 25 therein, it is to be noted that the proper inclination and dish of the disks 25 is set and their relative outward inclination being regulated by fastening elements in the form of nuts 26 carried by the upper reduced threaded shanks 21 provided upon the upper end of the shaft 20 upon the plate 22. Journaled within the opposite and inner free ends of the frame members 10 are the reduced end portions, not shown, of a relatively enlarged shaft 27 having a pair of arms 28 depending therefrom between the inner sides of the frame members 10, and having rotatably mounted within their lower free ends a roller 29 having a pair of adjustable bracket arms 30 which are secured to the axle thereof and in turn having their upper free ends associated and connected with the other side of the frame members 10, as clearly illustrated in Figure 2 of the drawing. Adjustable supporting arms 31 have their lower ends secured to the outer free end of the relatively enlarged shaft 27 and their corresponding upper ends being adjustably secured to the inner side of a pair of plow handles 32, the forward ends thereof being rigidly secured to the upper side of the plate 22 through the instrumentality of U-bolts 33 secured thereto. The conventional form of cross arm 34 extends between the inner sides of the handles 32 adjacent the inner ends thereof and holds the latter in their relative spaced relation.

In the use and operation of the present invention, it is clearly apparent that when the said cultivator, as defined and illustrated, is set in motion, the drum 17 which has its circumferential knife edge 18 positioned centrally thereof will limit the cut to be made by the disks 15. The disks owing to their relative pitch and dish forming hills, the tops of which being rolled down by the roller 29 carried upon the rear portion of the cultivator, thus completes a process of hilling.

The invention is susceptible of various changes in its form, proportion and minor details of construction, and the right is herein reserved to make such changes as properly fall within the scope of the appended claim.

Having thus described my invention, what is claimed is:

In a cultivator, a frame including opposed side members having the major portions of their length equi-distantly spaced apart and arranged parallel, and the remaining portions of their length convergently disposed and terminating in spaced parallel relation at opposite sides of the longitudinal medial line of the frame, a shaft supported between the side members at the rear of the frame, arms depending from the shaft, a drum journaled between said arms, each side member having an opening at the point of juncture between the major portion of its length and the convergently disposed forward extremity, a transverse plate supported on the frame and having openings registering with the aforementioned openings, shafts received by said openings for holding the plate attached to the frame, a yoke on the lower end of each shaft, a disk journaled in said yoke, divergently disposed handles having their forward extremities attached to said plate, a beam arranged between and supported by the convergently disposed extremities of the frame and having an opening therein, a shaft received by said opening, a yoke on the lower end of the shaft, and a drum journaled in said yoke.

In testimony whereof I affix my signature.

CLAUD $\underset{\text{mark}}{\overset{\text{his}}{\times}}$ CARTER.